REMOTE CONTROL RECEIVER FOR CENTRAL REMOTE CONTROL
INSTALLATIONS UTILIZING AUDIO-FREQUENCY SIGNALS
SUPERIMPOSED ON THE MAINS NETWORK

Filed June 20, 1957

HANS HÜRLIMANN

United States Patent Office 2,862,116

Patented Nov. 25, 1958

2,862,116

REMOTE CONTROL RECEIVER FOR CENTRAL REMOTE CONTROL INSTALLATIONS UTILIZING AUDIO-FREQUENCY SIGNALS SUPERIMPOSED ON THE MAINS NETWORK

Hans Hürlimann, Baar, Zug, Switzerland, assignor to Landis & Gyr A. G., Zug, Switzerland, a body corporate of Switzerland Application June 20, 1957, Serial No. 666,876

4 Claims. (Cl. 307—140)

Figure 1:
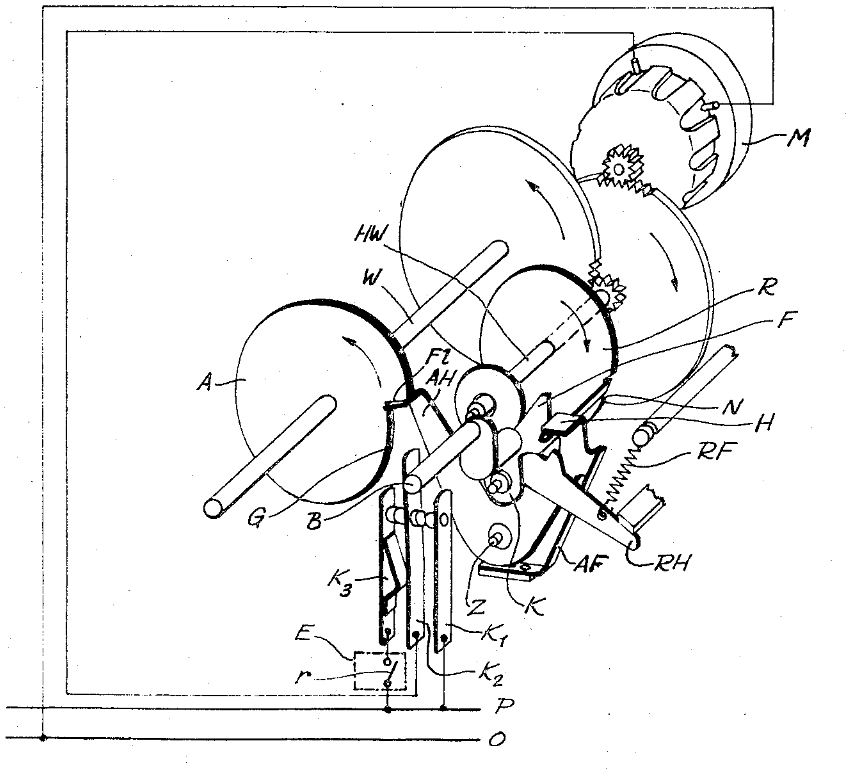

The present invention relates to a novel and improved synchronous selector remote control received to be actuated by audio-frequency signals superimposed on a mains network and received from a central remote control installation.

Objects and advantages of the invention will be set forth in part hereinafter and in part will be obvious herefrom, or may be learned by practice with the invention, the same being realized and attained by means of the parts, constructions, arrangements and combinations pointed out in the appended claims.

The invention consists in the novel parts, constructions, arrangements, combinations and improvements herein shown and described.

The accompanying drawings, referred to herein and constituting a part hereof illustrate several embodiments of the invention, and together with the description, serve to explain the principles of the invention.

As is known, central remote control installations, also called broadcast control installations, serve to enable switching orders to be sent from a control station through an electrical energy distribution network to all load points of the network, either for changing over tariffs of meters, or for switching on and off loads, for example boilers, furnaces, street lighting and the like, or again for controlling switches.

For this purpose, audio-frequency impulses are transmitted to the network from a transmitter at the control station, and the stations to be controlled comprise receivers which respond to predetermined signals and carry out the required switching function. The most common of the various known central remote control systems are based upon the time interval method. In this method, a series of order impulses follow a starter impulse on the time axis. These order impulses are generally produced by a synchronous selector acting as a transmitter, which operates in known manner on the energy transmission network to be controlled, through an audio-frequency transmitting installation. The receivers are generally selectors which rotate synchronously with the network frequency and whose selecting contacts correspond to the contacts of the synchronous transmitter.

Receiving arrangements of the aforesaid type often comprise very sensitive receiving relays, which can accordingly be operated by the interference voltages present in the network. Protection is generally afforded against continuous interference voltages by choosing a response voltage which is higher than the possible continuous level. For protection against brief, but relatively intense interference impulses, various steps have been proposed, some of which have been carried into practice. Thus, for example, it has already been proposed to provide in the remote control receivers a delay arrangement for the transmission of order impulses, which acts in such manner that interference impulses which are shorter than the order impulses cannot operate the receiving arrangement, or to provide in the synchronous selector, for preventing it from being automatically started by brief interference impulses, a resetting device which always resets the selector to the zero position when the duration of the impulses is not of a predetermined magnitude. It is then desirable to make the starter impulse longer than the order impulses and to make the aforesaid resetting value greater than the length of an order impulse. Protection is thereby afforded against self-starting, not only by brief interference impulses, but also by order impulses.

The present invention has for an object the provision of a novel and improved synchronous selector remote control receiver which is simple in construction and reliable in operation and which is adapted to be actuated by audio-frequency signals superimposed on a mains network and received from a central remote control installation. A further object is the provision of such a remote control receiver which is safeguarded against erroneous operation such as might be caused by interference voltages present in the network.

The present invention therefore provides a highly desirable type of resetting device, and provides a remote control receiver for central remote control installations utilizing audio-frequency signals superimposed on the mains network, also called broadcast control installations, which operates in accordance with the synchronous selector principle, that is to say, in which order impulses in timed relation with a starter impulse are processed by means of a synchronous selector, in which a shaft driven by a synchronous motor actuates on the one hand a contact arrangement associated with the starter impulse, and lying in the circuit of the synchronous motor driving the said shaft, and on the other hand at least one contact arrangement allocated to the order impulses, and in which the synchronous selector is provided with a resetting device such that the synchronous selector is returned into the zero position on deflection from this position by impulses which do not exceed a predetermined length which is shorter than the starter impulse, characterized in that the resetting device comprises a resetting member acting on the synchronous shaft, said resetting member being acted upon through a coupling by a resetting spring on a resetting lever member, and a retaining member acting on the synchronous shaft, said retaining member being acted upon by a retaining spring through the intermediary of a retaining lever member.

It will be understood that the foregoing general description and the following detailed description as well are exemplary and explanatory of the invention but are not restrictive thereof.

Figure 2:
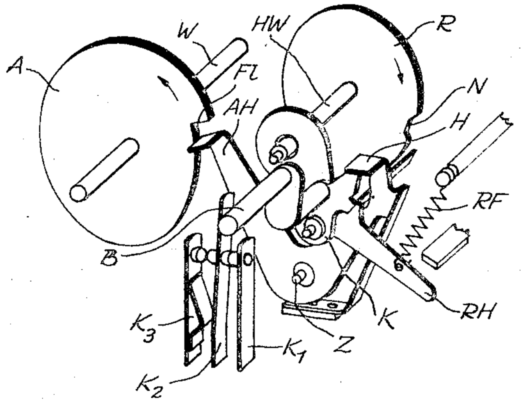

An embodiment of the invention will now be described by way of example with reference to the accompanying drawings, in which:

Figure 1 is a diagrammatic perspective view of part of a remote control receiver according to the invention; and Figure 2 is a fragmentary view of the mechanism shown in Figure 1 but with some of the components in a different stage of operation.

Figure 1 shows a constructional example of the subject of the invention, in which a retaining lever member AH is designed at the end opposite a retaining member A as a retaining abutment H for a coupling K, in such manner that after a certain angular rotation of a resetting member R a finger F of the coupling member K slides under the retaining abutment H, whereby the coupling member K is lifted out of a slot N and the resetting member R is thus released. After the lifting of the coupling member K from the slot N in the resetting member R, the retaining lever member AH is rotated against a retaining spring AF by means of a cam G on the retaining member A, so that after a particular rotation of the synchronous shaft W the finger F of the coupling member K is released again by the retaining abutment H. After a complete rotation of the synchronous shaft W, the coupling member K again engages directly in the slot N in the resetting member R when the retaining lever AH falls down a step FL on the retaining member A. The coupling member K is provided with a pin B which actuates a set of control contacts $K_1$, $K_2$, $K_3$ of a motor M driving the synchronous shaft W and an auxiliary shaft HW through toothed wheel gearing.

In the zero position illustrated in Figure 2, the pair of contacts $K_2$, $K_3$ is closed. When there are present at the network PO brief impulses which are capable of actuating a contact $r$ of a frequency-selective input system E (known per se and therefore not shown), the motor M produces deflections in the directions indicated by the arrows during the time that the contact $r$ is closed. When the impulses attain the length of the aforesaid starter impulse, the contact member K is lifted out of the slot N in the manner hereinbefore described and is held fast with the finger F below the abutment H, the pin B secured to the contact member K being retracted. The pair of contacts $K_2$, $K_3$ is thereby allowed to open and the normally closed contacts $K_1$, $K_2$ are allowed to close. This position is illustrated in Figure 2. The arrangement then performs a complete revolution until the retaining lever member AH again falls down the step Fl of the retaining member A and the coupling member K thus re-engages in the slot N in the resetting member R. The zero position and the corresponding position of control contacts $K_1$, $K_2$, $K_3$ as illustrated in Figure 1 are thereby restored. Naturally, other contacts intended for other purposes may be actuated in a similar manner to the set of control contacts $K_1$, $K_2$, $K_3$, such for example as normally closed contacts of a no-voltage relay which protects the receiver against failure of the mains voltage.

The arrangement according to the present invention not only affords the advantage that it reduces any tendency for the receiver to start under the action of brief interference impulses or of order impulses which are shorter than the starter impulse, but in addition, by reason of the precision of the zero position of the synchronous selector, it is possible to obtain greater precision of the relative positioning of the impulse patterns of the receivers which are often employed in large numbers in the network. Since the accuracy of the impulse pattern must satisfy certain requirements in regard to the synchronous position of the receivers in relation to the impulse patterns transmitted, in order to ensure correct operation of large numbers of receivers, the arrangement according to the present invention also considerably facilitates the mass production of the receiving equipment.

The described constructional example of the subject of the invention has the advantage that it can readily be combined to form a self-contained unit which can be incorporated, without appreciable further constructional steps, in receiving equipment which is not provided with a resetting device.

The invention in its broader aspects is not limited to the specific mechanisms shown and described but departures may be made therefrom within the scope of the accompanying claims without departing from the principles of the invention and without sacrificing its chief advantages.

What is claimed is:

1. In a remote control receiver for central remote control installations utilizing audio-frequency signals super-imposed on the mains network and operating in accordance with the synchronous selector principle, and in which order impulses in timed relation with a starter impulse are processed by means of a synchronous selector, having a shaft driven by a synchronous motor to actuate a contact arrangement after receiving a starter impulse and lying in the circuit of the synchronous motor driving the said shaft, at least one contact arrangement allocated to an order impulses, the synchronous selector being provided with a resetting device for returning the synchronous selector to its zero position on deflection from this position by impulses which do not exceed a predetermined length which is shorter than the starter impulse, said resetting device comprises a resetting member acting on the synchronous shaft, said resetting member being acted upon through a coupling by a resetting spring on a resetting lever member, and a retaining member acting on the synchronous shaft, said retaining member being acted upon by a retaining spring through the intermediary of a retaining lever member.

2. In a remote control receiver as claimed in claim 1, wherein the retaining lever member is formed at the end opposite the retaining member as a retaining abutment for the coupling member whereby after a certain angular rotation of the resetting member a finger of the coupling member slides under the retaining abutment, and the coupling member is lifted from a slot in the resetting member to free said member.

3. In a remote control receiver according to claim 2 wherein the coupling member is provided with a pin which actuates a set of control contacts of the synchronous motor driving the synchronous shaft and an auxiliary shaft through a toothed wheel gearing.

4. In a remote control receiver as claimed in claim 1 wherein a cam on the retaining member rotates the retaining lever member against the action of the retaining spring after the coupling member has been lifted from the slot in the resetting member, whereby a predetermined rotation of the synchronous shaft again frees the finger of the coupling member through the action of the retaining abutment, and the coupling member is directly reengaged in the slot of the resetting member after a complete rotation of the synchronous shaft and when the retaining lever falls down a step of the retaining member.

No references cited.